May 27, 1947.  H. A. GUTMANN  2,421,199

PROCESS FOR PRESERVING EGGS

Filed July 22, 1944

INVENTOR.
Hanns A. Gutmann
BY
Attorney

Patented May 27, 1947

2,421,199

UNITED STATES PATENT OFFICE 2,421,199

PROCESS FOR PRESERVING EGGS

Hanns A. Gutmann, Vineland, N. J.

Application July 22, 1944, Serial No. 546,082

2 Claims. (Cl. 99—161)

This invention relates to a method of preserving eggs, and has particular relation to a method in which the whites and yolks of eggs are preserved in coagulated or hard-boiled condition.

The main object of my present invention is to convert the eggs into a condition in which they can be easily and safely shipped and stored for an unlimited period of time.

Another object of my invention is to preserve the eggs in the form of products which, with regard to their chemical composition and taste, highly resemble fresh egg products.

A further object of my invention consists in providing a method of preserving eggs, which is simple and inexpensive and may be easily carried out in a relatively simple device or apparatus.

Other objects and the advantages of the invention will be apparent to those skilled in the art from the following specification and claims, and the appended drawings which illustrate, by way of example, some embodiments of my invention, and in which Figure 1 is a diagrammatical sectional view of a container or can adapted to be used in carrying out my invention;

According to my invention, the whites and yolks of eggs are removed from the shells, are heated to a suitable temperature until they coagulate, and are sterilized and hermetically sealed in containers.

Figure 1:
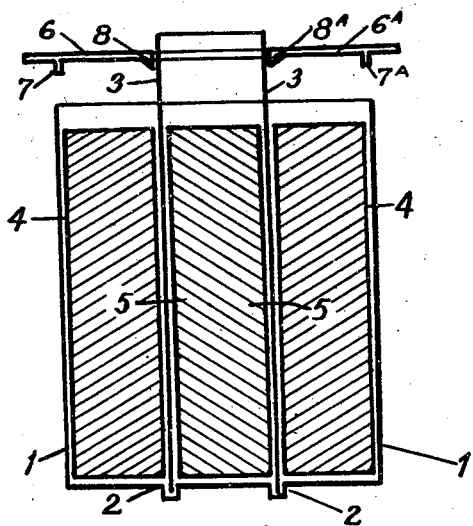
Figure 2:
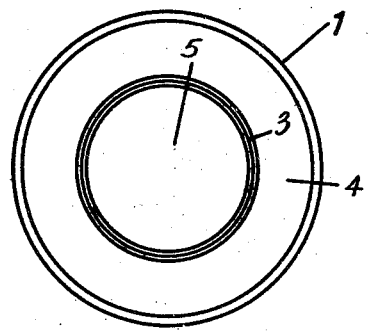
Figure 2 is a top view of the container shown in Figure 1.

According to the preferred embodiment of my invention egg white 4 is filled into a cylindrical container or can 1 shown in Figures 1 and 2. The bottom of this can 1 is provided with a circular groove 2, adapted to receive a cylindrical insert 3, which, after insertion into said groove, separates the interior of the can into an inner cylindrical and an outer annular space. The raw egg white is filled into said outer space and the container thus filled is then subjected to heat until the egg white is sufficiently coagulated to keep its shape. Insert 3 is now removed, the central space in the container is filled with raw egg yolk 5, and heat is applied again until the egg white and yolk are coagulated or hard-boiled. The container thus filled and treated is then sterilized by heat and provided with an air-tight seal in the customary manner used in preparing canned food products.

Figure 3:
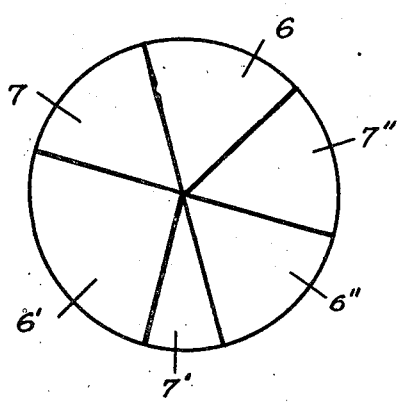
Figures 3 and 4 are diagrammatical views serving to illustrate some modified embodiments of my invention.
Figure 4:
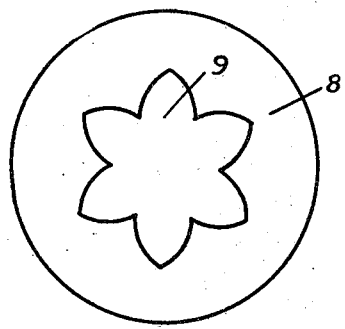

Instead of using a cylindrical insert, as shown in Figure 1, inserts of other shape, such as the inserts diagrammatically shown in Figures 3 and 4 may be used substantially in the above described manner. In these figures 6, 6', 6" and 7, 7', 7" and 8 and 9, denote the coagulated egg white and egg yolk, respectively.

The container may be provided with a cover 6A, having a central hole and projections 7A and 8A.

Coagulation by heating of the egg white and yolk may also be carried out in separate containers or molds. For example, in the container shown in Figure 1, the egg white may be introduced into and coagulated in the outer annular space; insert 3 may then be removed and cylindrically shaped egg yolk coagulated in a separate cylindrical mold corresponding in its dimensions to the central space of container 1, may then be introduced into said central space. Or both, the egg white and egg yolk may be coagulated by heating in suitably shaped and dimensioned molds, for example in an annular mold and a registering cylindrical mold. The coagulated and shaped annular egg white and the cylindrically shaped egg yolk may then be assembled in a suitable container or can in which they are sterilized and hermetically sealed.

It will be understood by those skilled in the art that my invention is not limited to the above described embodiments and details and may be carried out with various modifications. For example, instead of a cylindrical container or can, containers or cans of other suitable shape, such as of rectanguar shape may be used. The coagulated egg white and yolk may have shapes different from those described above and illustrated in the drawings. The use of grooves 2 shown in Figure 1 is not indispensable, as inserts resting on the bottom of the container may also be employed. Instead of having the coagulated egg white arranged as an outer ring surrounding the coagulated egg yolk, this arrangement may be reversed, i. e., by using an outer ring of coagulated egg yolk surrounding the coagulated egg white. The ratio of egg white and egg yolk in the container may correspond to the natural ratio in eggs or may be different. Preserving means may also be added to the egg white or yolk, if desired. The container may consist of metal or other suitable material such as glass or ceramic material. These and other modifications may be made without departing from the spirit of my invention as defined in the appended claims. The size of the container used and the amount of egg white and yolk contained therein may vary within wide limits.

The egg whites and yolks may also be coagulated simultaneously. In this case they are filled into the ring space of container 1 and insert 3, respectively, whereupon they are coagulated by heat and the insert is removed subsequently.

I claim:

1. A method of preserving eggs, said method comprising introducing into a container a centrally arranged tubular insert, filling into the space between the wall of said insert and the wall of the container raw egg white, coagulating said egg white, removing said tubular insert, filling raw egg yolk into the central space left in the coagulated egg white, coagulating the egg yolk and sterilizing and sealing the container.

2. A method of preserving eggs, said method comprising introducing into a container a centrally arranged tubular insert, filling into the space between the wall of said insert and the wall of the container raw egg white, filling raw egg yolk into the insert, coagulating the egg white and yolk, removing said tubular insert and sterilizing and sealing the container.

HANNS A. GUTMANN.

REFERENCES CITED

The following references are of record in the file of this patent:

UNITED STATES PATENTS

| Number | Name | Date |
|---|---|---|
| 1,648,359 | Newman | Nov. 8, 1927 |
| 1,822,170 | Paradise | Sept. 8, 1931 |

FOREIGN PATENTS

| Number | Country | Date |
|---|---|---|
| 136,353 | Germany | 1900 |
| 90,126 | Sweden | 1935 |
| 353,282 | Italy | 1937 |

OTHER REFERENCES

White, Food Industries, March 1942, pages 38 and 39.